United States Patent
Wu et al.

(10) Patent No.: US 12,464,433 B2
(45) Date of Patent: Nov. 4, 2025

(54) INFORMATION FORWARDING VIA SIDELINK RELAY

(71) Applicant: Apple Inc., Cupertino, CA (US)

(72) Inventors: Zhibin Wu, Los Altos, CA (US); Sethuraman Gurumoorthy, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 426 days.

(21) Appl. No.: 17/871,863

(22) Filed: Jul. 22, 2022

(65) Prior Publication Data

US 2023/0101557 A1 Mar. 30, 2023

Related U.S. Application Data

(60) Provisional application No. 63/248,427, filed on Sep. 24, 2021.

(51) Int. Cl.
| | |
|---|---|
| *H04W 40/22* | (2009.01) |
| *H04W 4/90* | (2018.01) |
| *H04W 60/06* | (2009.01) |
| *H04W 68/00* | (2009.01) |
| H04W 88/04 | (2009.01) |

(52) U.S. Cl.
CPC .............. *H04W 40/22* (2013.01); *H04W 4/90* (2018.02); *H04W 60/06* (2013.01); *H04W 68/005* (2013.01); *H04W 88/04* (2013.01)

(58) Field of Classification Search
CPC ....... H04W 40/22; H04W 4/90; H04W 60/06; H04W 68/005; H04W 88/04; H04W 92/18; H04W 48/12

USPC .......................................................... 370/315
See application file for complete search history.

(56) References Cited

U.S. PATENT DOCUMENTS

| | | | |
|---|---|---|---|
| 2018/0279110 A1* | 9/2018 | Sen | H04W 8/005 |
| 2019/0320443 A1 | 10/2019 | Wang et al. | |
| 2020/0245226 A1 | 7/2020 | Kuang et al. | |
| 2021/0120476 A1* | 4/2021 | Lee | H04W 48/10 |
| 2022/0141756 A1* | 5/2022 | Pan | H04W 48/12 |
| | | | 370/328 |
| 2023/0246701 A1* | 8/2023 | Cheng | H04W 72/25 |
| | | | 370/315 |
| 2023/0300725 A1* | 9/2023 | Basu Mallick | H04W 48/14 |
| | | | 370/329 |
| 2024/0080658 A1* | 3/2024 | Chen | H04W 48/16 |
| 2024/0163934 A1* | 5/2024 | Freda | H04W 76/27 |

FOREIGN PATENT DOCUMENTS

| | | |
|---|---|---|
| CN | 110771257 A | 2/2020 |
| KR | 20190022489 A | 3/2019 |
| KR | 20200076702 A | 6/2020 |

(Continued)

OTHER PUBLICATIONS

SI Forwarding for L2 UE to NW Relays, InterDigital Inc., 3GPP RAN WG2 Meeting #115-e Online, R2-2107275, Aug. 2021, 3 pages.

(Continued)

*Primary Examiner* — Candal Elpenord
(74) *Attorney, Agent, or Firm* — Kilpatrick Townsend & Stockton LLP

(57) ABSTRACT

The present application relates to devices and components including apparatus, systems, and methods for information forwarding via sidelink relays in wireless networks.

16 Claims, 12 Drawing Sheets

(56) References Cited

FOREIGN PATENT DOCUMENTS

| WO | 2017155291 A2 | 9/2017 |
|---|---|---|
| WO | 2018194390 A1 | 10/2018 |

OTHER PUBLICATIONS

SI message forwarding in L2 U2N relay, Samsung Electronics, 3GPP TSG-RAN WG2 Meeting #115-e Online, R2-2107708, Aug. 9-27, 2021, 3 pages.

SI acquisition, CN Registration and RNAU, Lenovo, Motorola Mobility, 3GPP TSG-RAN WG2 Meeting #115-e Online, R2-2108007, Aug. 2021, 3 pages.

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

3rd Generation Partnership Project; Technical Specification Group Radio Access Network; NR; NR and NG-RAN Overall Description; Stage 2 (Release 16), 3GPP TS 38.300 V16.6.0, Jun. 2021, 152 pages.

System Information, Paging Delivery and UAC in L2 U2N Relay, Qualcomm Incorporated, 3GPP Draft; R2-2102695, 3rd Generation Partnership Project (3GPP), Apr. 2, 2021, 7 pages.

European Patent Application No. 22187346.6, Extended European Search Report, Feb. 6, 2023, 10 pages.

Korea Patent Application No. 10-2022-0096946, Office Action, Aug. 25, 2024, 13 pages.

SI Acquisition, CN Registration and RNAU, 3rd Generation Partnership Project Technical Specification Group-Radio Access Network Working Group2 Meeting #115 electronic, R2-2108007, Aug. 2021, 3 pages.

China Patent Application No. 202210934083.6, Office Action, Dec. 31, 2024, 23 pages.

European Patent Application No. 22187346.6, Office Action, Apr. 14, 2025, 6 pages.

China Patent Application No. 202210934083.6, Office Action, Aug. 2, 2025, 22 pages.

\* cited by examiner

INFORMATION FORWARDING VIA SIDELINK RELAY

CROSS-REFERENCE TO RELATED APPLICATION

This application claims the benefit of U.S. Provisional Patent Application No. 63/248,427, filed on Sep. 24, 2021, which is herein incorporated by reference in its entirety for all purposes.

BACKGROUND

Third Generation Partnership Project (3GPP) Technical Specifications (TSs) define standards for New Radio (NR) wireless networks. These TSs describe aspects related to transmitting system information and paging messages in wireless networks.

DETAILED DESCRIPTION

Figure 1:
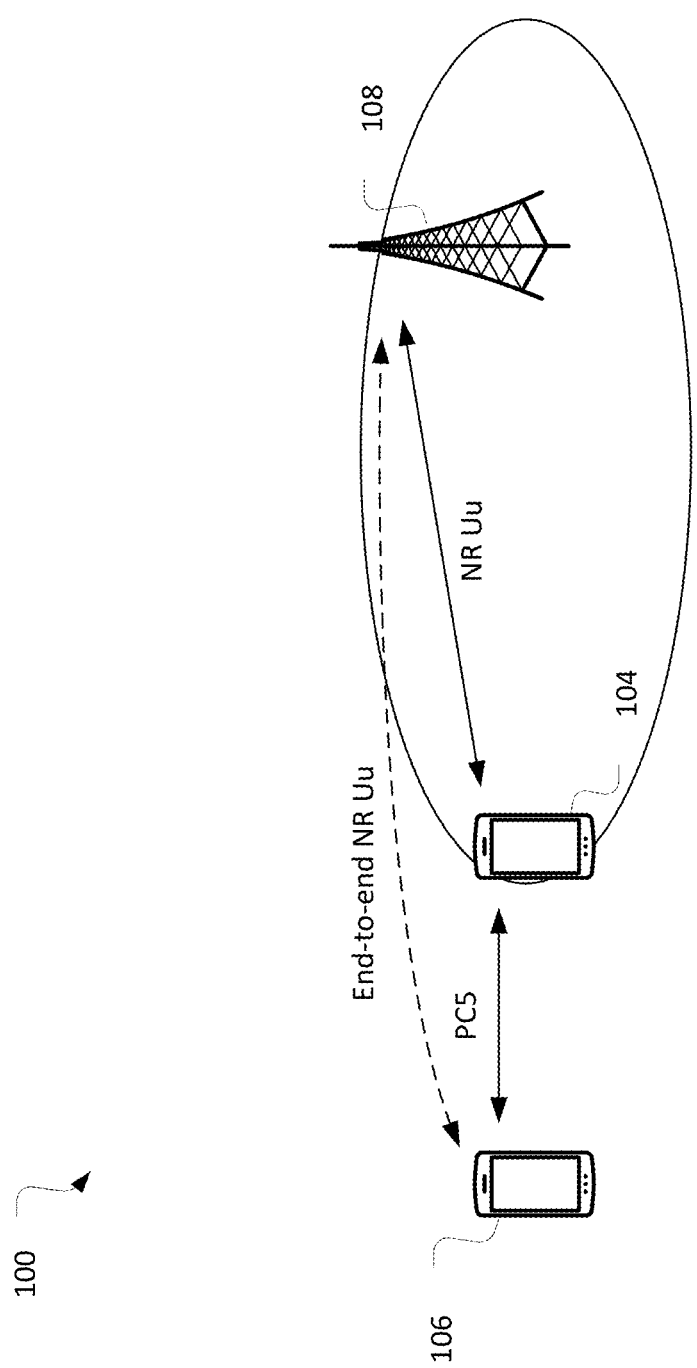
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include user equipments (UEs) 104 and 106 and a base station 108 of a radio access network (RAN). The base station 108 may be a next generation node B (gNB) to provide one or more 5G New Radio (NR) cells to provide NR user plane and control plane protocol terminations toward the UEs 104/106.

The UE 104 may be disposed within an NR cell provided by the base station 108 and may be coupled with the base station 108 via an NR Uu interface. The UE 104 may also have a sidelink connection over a sidelink physical interface, which may also be referred to as a PC5 interface, with a remote UE 106. The UE 104 may act as a UE-to-network relay to extend network coverage to the remote UE 106. The remote UE 106 may be outside of the network coverage due to a location of the remote UE 106 being outside of the NR cell or because the remote UE 106 has turned off its Uu modem to save power, for example, and is only operating its sidelink modem. By providing a layer 2 UE-to-NW relay, the remote UE 106 may be accessible and controllable by the base station 108 via an end-to-end NR Uu interface that includes the PC5 and the NR Uu interfaces. The UE 104, which may also be referred to as relay UE 104, may facilitate access and control by the base station 108 by forwarding system information and paging messages to the remote UE 106.

In some embodiments, the base station 108 may transmit downlink control information (DCI) with an indicator to indicate whether particular system information has been updated by the network. For example, a DCI may include a system information modification (systemInfoModification) field with one bit that, if set to '1,' may indicate a broadcast control channel (BCCH) modification other than system information block (SIB) 6, SIB 7, or SIB 8. The BCCH modification may occur in a modification period that immediately follows the modification period in which the system information modification indication is transmitted.

SIB6/7/8 may correspond to a public warning system (PWS) system information. SIB 6 may be used to support earthquake and tsunami warning system (ETWS) primary notifications (for example, short notifications delivered within four seconds). SIB 7 may be used to support ETWS secondary notifications, which include more detail than the primary notifications. SIB 8 may be used to provide commercial mobile alert service (CMAS) notifications. CMAS notifications may allow service providers to send emergency alerts as text messages to their users.

For PWS updates, the DCI may include an ETWS and CMAS indication (etwsAndCmasIndication) field with one bit that, if set to '1,' may indicate an ETWS primary notification, and ETWS secondary notification, or a CMAS notification. For example, an update to SIB6/7/8.

The systemInfoModification and etwsAndCmasIndication bits may be set in a DCI format 1_0 that has its cyclic redundancy check (CRC) bits scrambled with a paging radio network temporary identity (P-RNTI).

For idle or inactive UEs, the base station 108 may repeatedly transmit the etwsAndCmasIndication bit because the network may want to alert all entering UEs to receive the PWS warning. However, UEs that have already received the warning, may not necessarily know whether the warning corresponds to a new PWS message. Thus, the UEs may repeatedly decode the same SIB6/7/8. If the content of the decoded message has already been received, a UE may not provide the content to higher-layers of the UE for display or further action.

As the remote UE 106 is out of coverage (or has its Uu mode off), it may not be able to receive system information directly from the base station 108. The system information message for PWS (SIB6/7/8) may be forwarded by the relay UE 104 to the remote UE 106 via sidelink (which may work in any RRC state of the remote UE); or pushed by the network to the remote UE 106 with dedicated RRC signaling (if/when the remote UE 106 enters an RRC connected mode).

Some embodiments describe the UE 104 performing a filtering process with respect to forwarded PWS system information messages. For example, the relay UE 104 may decode a complete set of SIB6/7/8 and forward only a consistent set to the remote UE 106. A consistent set may exclude duplicates and out-of-order segments. The relay UE 104 may only need to forward a new, complete PWS message to the remote UE 106. For example, the relay UE 104 may forward segments only if a complete set of segments are received. By performing the filtering in the relay UE 104, the remote UE 106 may not need to receive and waste power processing incomplete pieces or duplicates.

Figure 2:
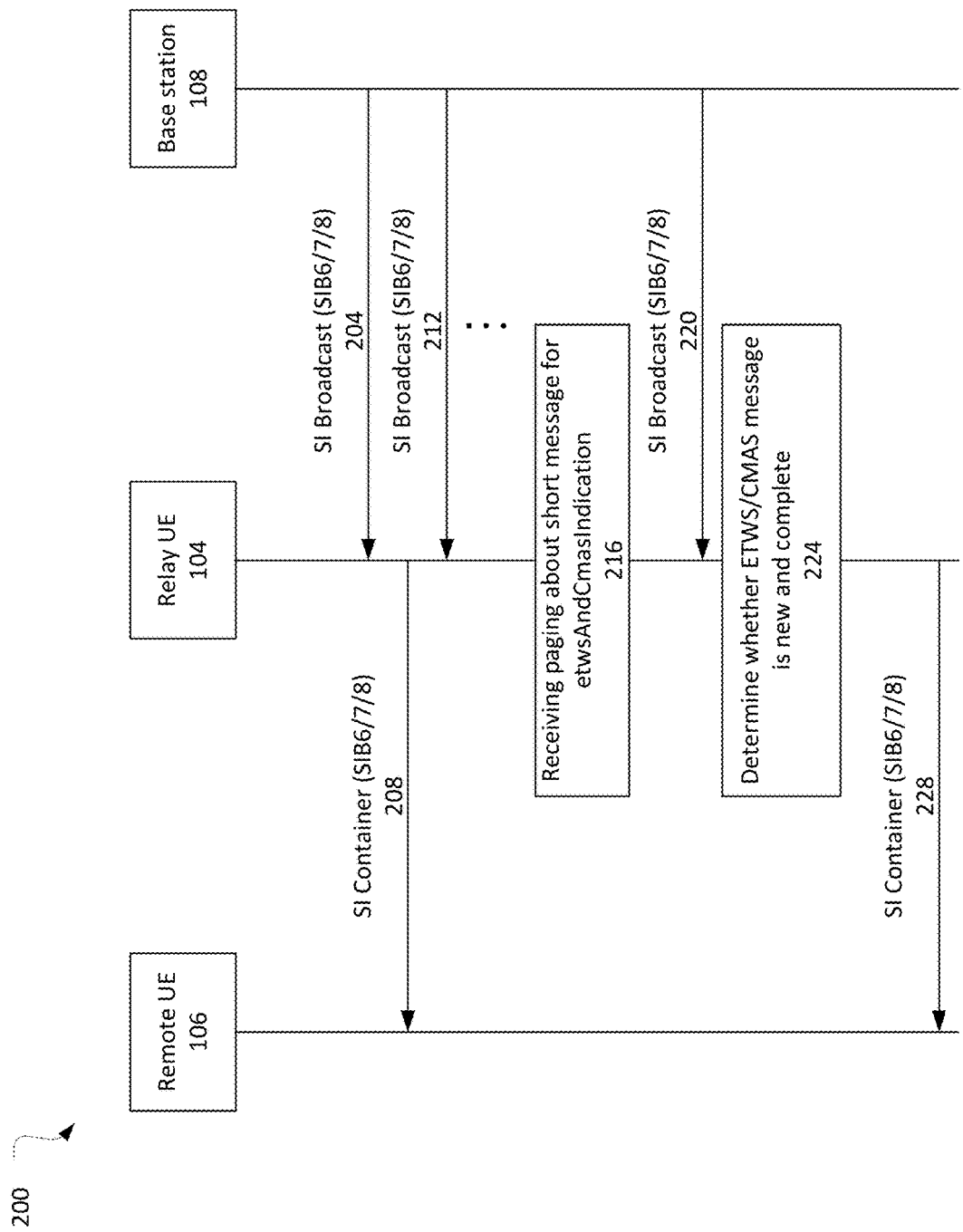
FIG. 2 illustrates a signaling flow in accordance with some embodiments.

FIG. 2 illustrates a signaling flow 200 that describes filtering and forwarding system information messages in accordance with some embodiments. The relay UE 104 may receive SI broadcast message 204, which may include a SIB6, SIB7, or SIB8, and may transmit information corresponding to the SIB broadcast message 204 in an SI container 208. The information forwarded in the SI container may include or be based on the SIBs of the SI broadcast 204. The SI container 208 may be transmitted over the PC5 interface to the remote UE 106.

Another SI broadcast message 212 may be sent, but the relay UE 104 has not received an indication of a PWS modification and, therefore, it may not need to decode the SI broadcast message 212. Thus, the relay UE 104 may also not forward another SI container at that time.

At 216, the relay UE 104 may receive paging about a short message for etwsAndCmasindication. For example, the relay UE 104 may process DCI format 1_0 that includes CRC scrambled with P-RNTI to determine that the etwsAndCmasindication is set to '1.'

After receiving the paging about the short message for etwsAndCmasindication, the relay UE 104 may receive and decode SI broadcast 220. At 224, the relay UE 104 may determine whether the ETWS/CMAS message transmitted by SIB6/7/8 of the SI broadcast 220 is new and complete. The relay UE 104 may determine the ETWS/CMAS message is new if it includes information that was not previously provided to the remote UE 106. The relay UE 104 may determine the ETWS/CMAS message is complete if it includes all segments in their proper order. In the event the ETWS/CMAS message is not complete, the relay UE 104 may attempt to obtain additional SI broadcast messages until the ETWS/CMAS message is complete.

Upon determining the ETWS/CMAS message is new and complete, the relay UE 104 may forward the ETWS/CMAS message to the remote UE 106 in an SI container (SI) 228. This may be transmitted over the PC5 interface. The SI container used to transmit the ETWS/CMAS message over the PC5 interface may be a PC5-RRC message; a message transmitted on a sidelink radio bearer that is designated for SI message forwarding; or a relay discovery message.

In some embodiments, the relay UE 104 may filter PWS messages based on a location of the remote UE 106. For example, it is typical that warnings are broadcast in a large geographical area (often in county-levels in the United States) to ensure broad coverage. However, in many situations this broadcast coverage may be excessive as a large number of non-relevant recipients may be included. Further, cell tower coverages may be overlapping in high-density areas and the cell-level broadcasting may not be able to target specific local areas. Therefore, some embodiments describe the relay UE 104 utilizing location information about the remote UE 106 to facilitate highly localized PWS warnings.

A PWS message may include information that defines a particular alert area. For example, the PWS message may provide a UE with alert area coordinates that may be used for geo-targeting or geo-fencing. In some embodiments, the relay UE 104 may include geo-fencing detection logic that uses location information of the remote UE 106 and the alert area information to timely and appropriately trigger forwarding of geo-fencing PWS messages to the remote UE 106.

Figure 3:
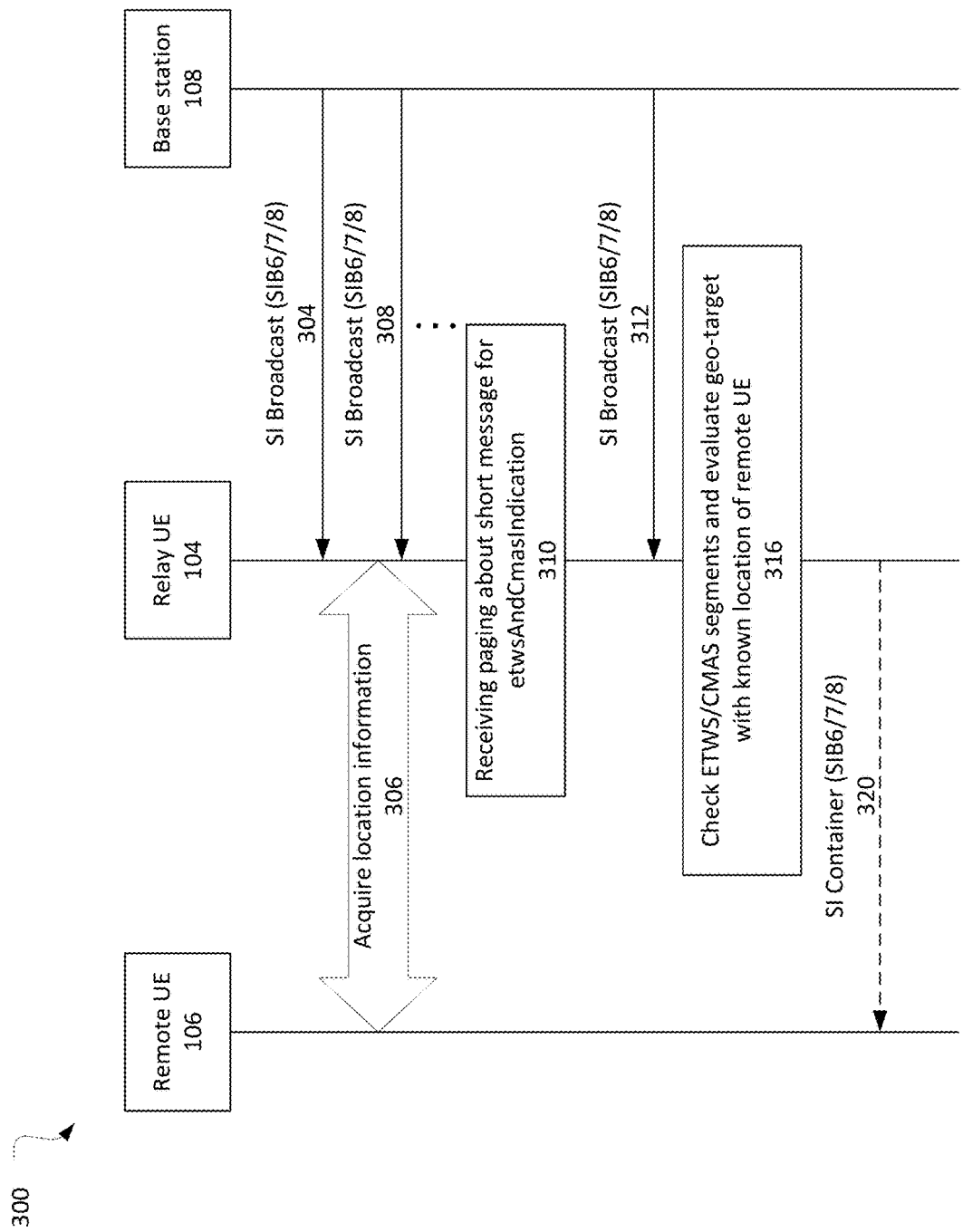
FIG. 3 illustrates another signaling flow in accordance with some embodiments.

FIG. 3 illustrates a signaling flow 300 that describes location-based filtering and forwarding system information messages in accordance with some embodiments.

The signaling flow 300 may include the base station 108 periodically transmitting SI broadcasts 304, 308, . . . 312 similar to that discussed above.

At 306, the relay UE 104 may acquire location information with respect to the remote UE 106. In some embodiments, the location information may be based on a nature of the sidelink communications established between the relay UE 104 and the remote UE 106. For example, the relay UE 104 may have some knowledge of the upper bound of a sidelink communication range. It may use this knowledge to determine a rough location of the remote UE 106. The upper bound of the sidelink communication range may be based on the technology used for the sidelink communications. For example, a wired connection or short-range wireless connection may ensure the remote UE 106 is in a relatively close proximity with the relay UE 104. In other embodiments, other sidelink positioning or ranging methods may be used. For example, the relay UE 104 may derive a relative distance to the remote UE 106 based on measurements of sidelink radio quality. Measurements of the sidelink radio quality may include, for example, sidelink discovery-reference signal receive power (SD-RSRP) or sidelink-reference signal receive power (SL-RSRP) measured from sidelink channel state information. In other embodiments, the remote UE 106 may provide its location information (for example, GPS coordinates) to the relay UE 104 directly.

At 310, the relay UE 104 may receive paging about a short message for etwsAndCmasindication. For example, the relay UE 104 may process DCI format 1_0 that includes CRC scrambled with P-RNTI to determine that the etwsAndCmasindication is set to '1.' After receiving the paging about the short message for etwsAndCmasindication, the relay UE 104 may receive and decode SI broadcast 312, which may include a SIB6, SIB7, or SIB8.

At 316, the relay UE 104 may check the ETWS/CMAS segments of the SI broadcast 312 and perform a geo-target evaluation based on the known location of the remote UE 106. For example, the ETWS/CMAS segments may be associated with a particular alert area and the relay UE 104 may determine whether the remote UE 106 is located within the alert area. If the remote UE 106 is located within the alert area, the relay UE 104 may transmit information corresponding to the SIB broadcast message 312 in an SI container (SI) 320 over the PC5 interface. In some embodiments, the relay UE 104 may also determine that the ETWS/CMAS message is new and complete before forwarding similar to that discussed above with respect to FIG. 2.

In some embodiments, when the conditions for geo-fencing the ETWS/CMAS alert display are met, the relay UE 104 may simply forward the alert to the remote UE 106 as a normal ETWS/CMAS message. The remote UE 106 may simply display the corresponding alert without having to perform further tracking and determining whether conditions of displaying a geofenced ETWS/CMAS alert are satisfied. This may save power for the remote UE 106.

While the above embodiments describe filtered forwarding of PWS messages, similar concepts may also be applied to forwarding other types of system information. For example, if the relay UE 104 forwards a systemInfoModification indication to the remote UE 106, the remote UE 106 may not know which system information has been modified. It may then need to send a solicitation message for every system information of interest, which may waste resources and may not even result in new information being provided to the remote UE 106. Therefore, some embodiments may use the relay UE 104 as a gating function to forward selected system information messages to the remote UE 106. In some embodiments, the relay UE may examine the updated system information and voluntarily forward, to the remote UE 106, all SIBs that have been updated by the network. This forwarding may optionally be sent along with the system information modification indication. In other embodiments, the forwarding may be based on interests expressed by the remote UE 106.

Figure 4:
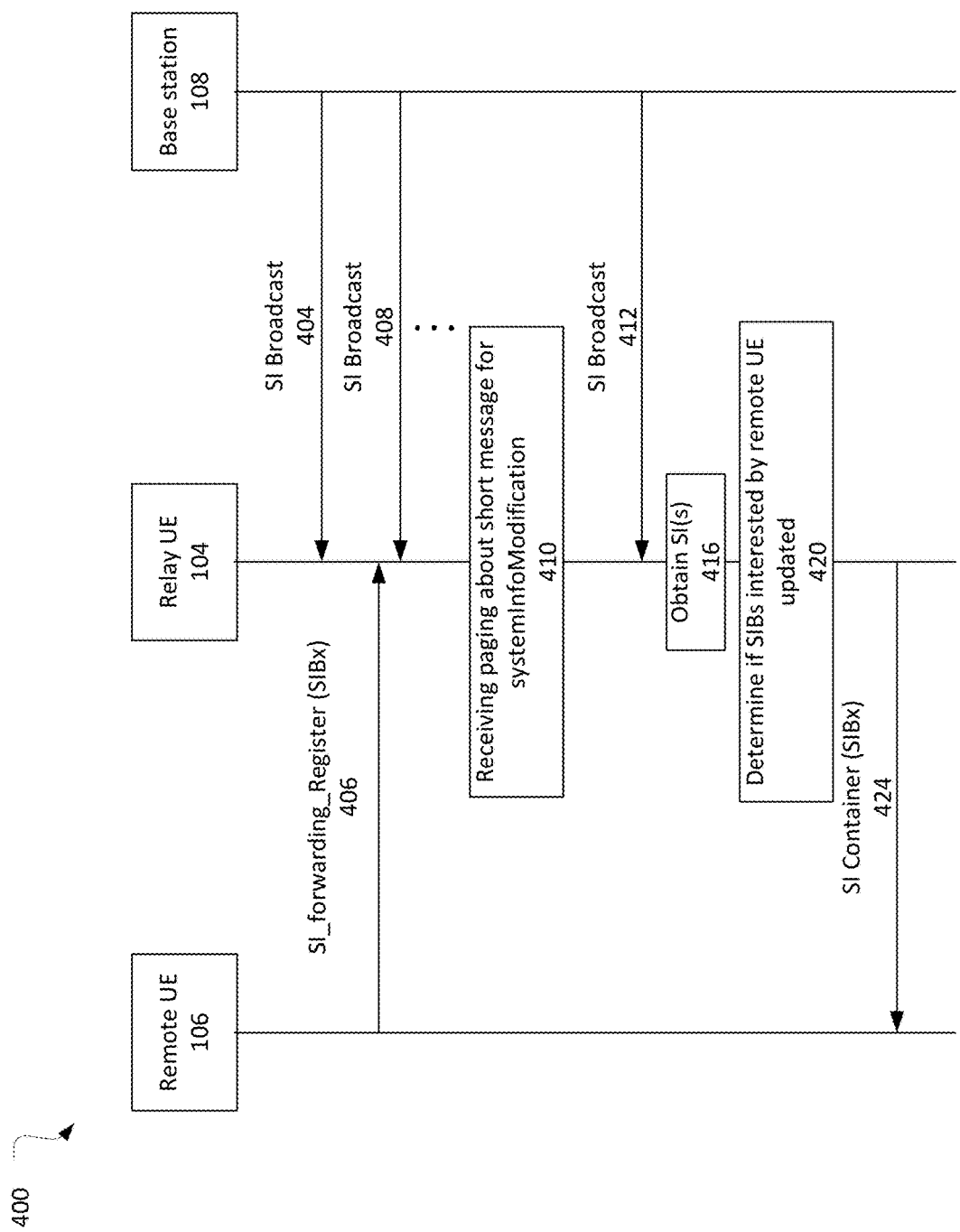
FIG. 4 illustrates another signaling flow in accordance with some embodiments.

FIG. 4 illustrates a signaling flow 400 that describes selective forwarding of system information messages in accordance with some embodiments.

The signaling flow 400 may include the base station periodically transmitting SI broadcasts 404, 408, . . . 412.

At 406, the remote UE 106, which may be in RRC idle or inactive mode, may provide the relay UE 104 with an SI forwarding register message (SIBx). The SI forwarding register message may register or subscribe system information interests of the remote UE 106 with the relay UE 104. In some embodiments, the message may include a full request that includes a full list of SIBs that are of interest to the remote UE 106 and that are to be forwarded by the relay UE 104. In other embodiments, the message may include a delta request in which the remote UE 106 only indicates changes from a previous request. This message may include one or more SIBs that are to be added to an interest list associated with the remote UE 106, or may include one or more SIBs that are to be removed from the interest list. The relay UE 104 may keep an interest list (for example, an SI bitmap) corresponding to each remote UE with which it is connected and providing relay functions.

At 410, the relay UE 104 may receive paging about a short message for systemInfoModification. For example, the relay UE 104 may process DCI format 1_0 that includes CRC scrambled with P-RNTI to determine that the systemInfoModification bit is set to '1.' After receiving the paging about the short message for systemInfoModification, the relay UE 104 may receive and decode SI broadcast 412.

At 416, the relay UE 104 may obtain the system information from the SI broadcast 412. At 420, the relay UE 104 may determine whether any SIBs that are of interest to the remote UE 104 have been updated. In the event that one or more SIBs of interest have been updated, the relay UE 104 may forward the relevant SIBs (denoted generically as SIBx) in SI container (SI) 424.

In some embodiments, the remote UE 106 may send a de-registration message via the sidelink to stop the forwarding operation.

Figure 5:
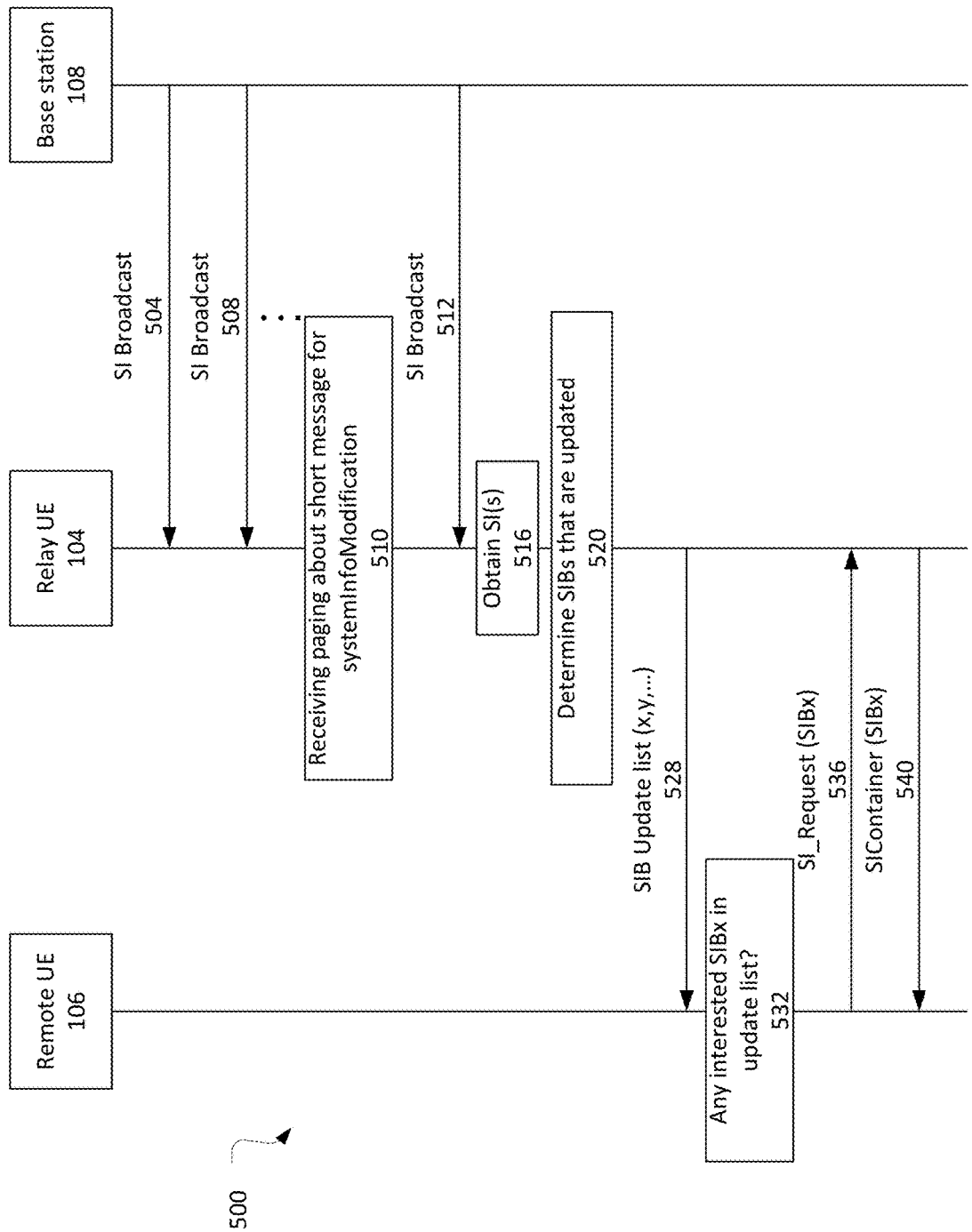
FIG. 5 illustrates another signaling flow in accordance with some embodiments.

FIG. 5 illustrates a signaling flow 500 that describes selective forwarding of system information messages in accordance with some embodiments.

The signaling flow 500 may include the base station periodically transmitting SI broadcasts 504, 508, . . . 512.

At 510, the relay UE 104 may receive paging about a short message for systemInfoModification. For example, the relay UE 104 may process DCI format 1_0 that includes CRC scrambled with P-RNTI to determine that the systemInfoModification is set to '1.' After receiving the paging about the short message for systemInfoModification, the relay UE 104 may receive and decode SI broadcast 512.

At 516, the relay UE 104 may obtain the system information from the SI broadcast 512. At 520, the relay UE 104 may determine the SIBs that have been updated. At 524, the relay UE 104 may send a SIB update list (x, y, z) that includes a list of the SIBs determined to have been updated. The list may simply include an index of the changed SIB. For example, a list indicating (x, y, z) may indicate that SIBx, SIBy, and SIBz have changed, without providing the SIBs themselves. In some embodiments, the SIB update list may include a list of indices of all the SIBs that were acquired/examined and may include additional indication of whether the corresponding SIB was updated. The SIB update list may be a PC5-RRC message.

In some embodiments, it may be assumed that the relay UE 104 has examined every SIB that may have been updated. In other embodiments, the relay UE 104 may not need to examine all SIBs. Rather, the relay UE 104 may only examine a subset of the possible SIBs and may convey this information about the subset to the remote UE 106. The subset may include SIBs selected based on an interest of the relay UE 104 or some other criteria. The information about the subset conveyed to the remote UE 106 in the SI update list at 528 may include which SIBs have been updated and which SIBs have not. The relay UE 104 may not have information on SIBs that are not listed explicitly in the information about the subset.

At 532, the remote UE 106 may determine whether it is interested in any SIBs that are included in the update list and, if so, trigger an on-demand solicitation request. For example, if the remote UE 106 is interested in a SIB (e.g., SIBx) that is indicated as being updated by the SIB update list, the remote UE 106 may transmit an SI request for the SIB at 536. The relay UE may then respond at 540 with an SI container that includes the updated SIB.

If the remote UE 106 is interested in a SIB for which the relay UE 104 has no knowledge, the remote UE 106 may request that the relay UE 104 obtain information related to that SIB. In this case, the relay UE 104 has not indicated whether the SIB has been changed or not in its signaling. Therefore, the update status of the SIB is ambiguous. But if the remote UE 106 is indeed interested in this SIB, it will initiate a request on-demand for this particular SIB and the relay UE 104 will then acquire and examine that specific SIB. If that SIB has been changed, then the relay UE will pass the changed SIB to remote UE 106.

If none of the SIBs in which the remote UE 106 is interested have been updated, the remote UE 106 may not trigger an on-demand procedure.

If the remote UE 106 in the relay UE 104 are always on, the procedures described above may reduce signaling overhead, but may be less effective in reducing power consumption used for sidelink communication. To further reduce power consumption, the relay UE 104 and the remote UE 106 may coordinate communications using specifically designed sidelink-discontinuous reception (SL-DRX) configurations. SL-DRX may be used for remote UEs in idle/inactive mode to reduce wake up time.

When operating in SL-DRX, the remote UE 106 may go to sleep (for example, power down components of its receive circuitry) for periods of time in which it does not need to listen to the sidelink channel. An SL-DRX configuration may include a DRX cycle and an on-duration period. The remote UE 106 may wake up to monitor PSCCH during the on-duration period. After the on-duration period, assuming no wake-up signal is received, the remote UE 106 may go back to sleep. The DRX cycle may define the length of time between consecutive on-duration periods.

In some embodiments, the relay UE 104 and the remote UE 106 may use SL-DRX configurations that are suitable for paging and SI forwarding. Selecting an SL-DRX configuration for paging/SI forwarding may involve considering trade-offs between power efficiency and latency of the forwarded communications. Various embodiments describe SL-DRX configuration specifically tailored to paging (for example, a paging SL-DRX), specifically tailored to system information (for example, an SI SL-DRX), or generically applicable to both paging and system information (for example, a paging/SI SL-DRX).

Figure 6:
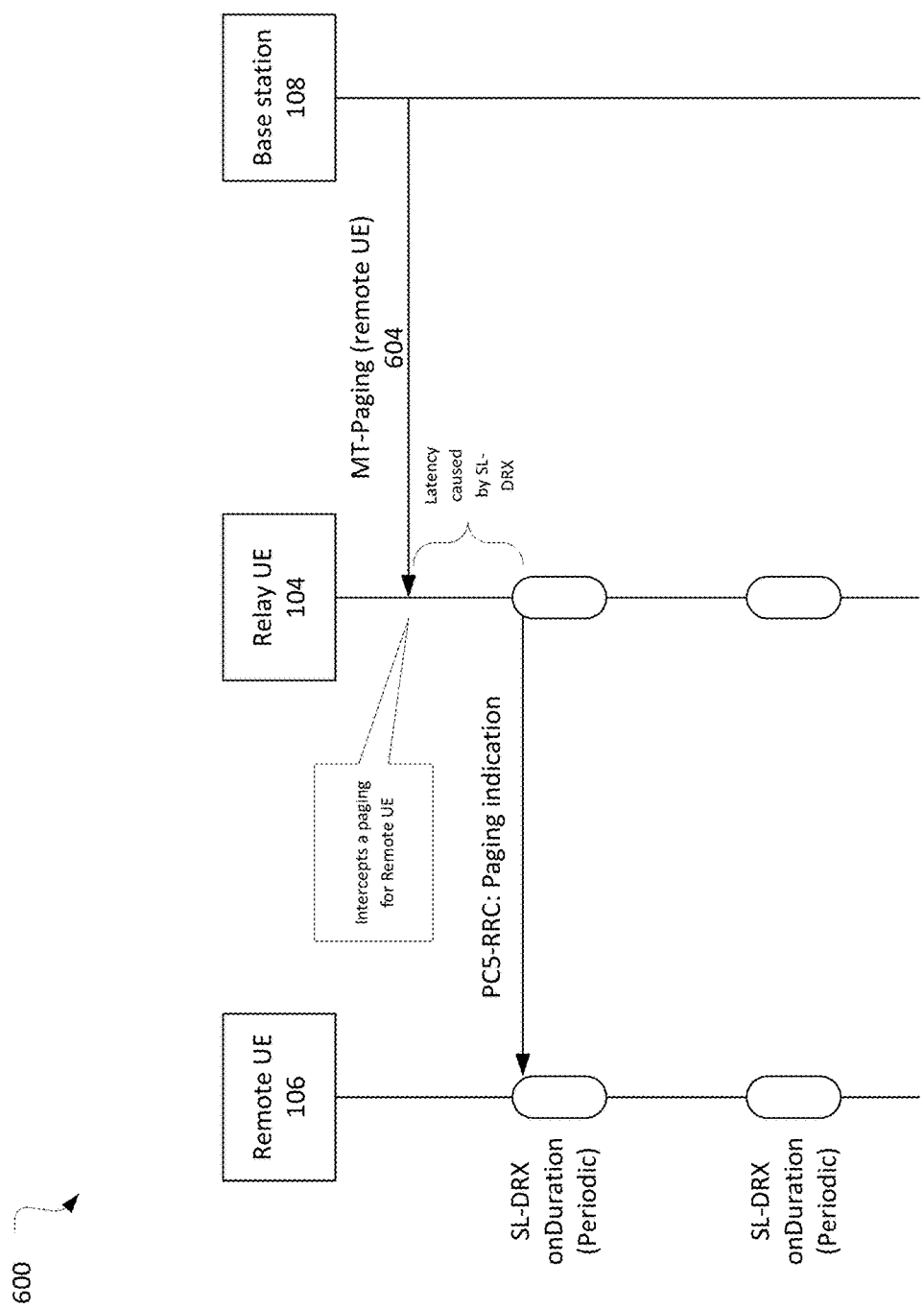
FIG. 6 illustrates another signaling flow in accordance with some embodiments.

FIG. 6 provides a signaling diagram 600 that illustrates a paging SL-DRX in accordance with some embodiments. The paging SL-DRX configuration may be a unicast DRX configuration between one relay UE and one remote UE that is designated for forwarding paging messages.

The paging SL-DRX may be configured between the relay UE 104 and the remote UE 106 based on a paging occasion of the remote UE 106. For example, at a paging occasion of the remote UE 106, the base station 108 may transmit a mobile terminated (MT) paging message for the remote UE at 604. This paging message may be intercepted by the relay UE 104. The paging SL-DRX configuration may be set to provide a periodic SL-DRX on-duration period a certain time after the paging occasion. The time between the paging occasion and the SL-DRX on-duration period may be considered latency caused by the SL-DRX. Thus, the SL-DRX configuration may be configured to provide the SL-DRX on-duration period as close as possible (for example, immediately after) the reception in the paging occasion.

The starting time of the on-duration period may be right after the relay UE 104 monitors and decodes the paging occasion of the remote UE 106. In some embodiments, a small offset may be provided from the paging occasion to the start of the on-duration period to account for the relay operations of the relay UE 104.

During the SL-DRX on-duration period, for example, at 608, the relay UE 104 may forward a paging indication from the MT paging message. The paging indication may be transmitted in a PC5-RRC message.

The DRX cycle of the paging SL-DRX configuration may be set equal to the RAN/core network paging cycle of the remote UE. In that manner, an on-duration period may correspond to each paging occasion to provide the relay UE 104 with the opportunity to forward a paging indication in the event an MT-paging message is received.

In some embodiments, the paging SL-DRX configuration may be established based on DRX configuration provided by the base station 108. In this manner, the base station 108 may know the paging DRX cycle and provide paging messages in a manner to align with the on-duration periods.

Configuring SL-DRX for forwarding system information messages may be more involved than configuring SL-DRX for forwarding paging messages. For example, the SI may be unicast to a particular remote UE or broadcast/groupcast to a plurality of remote UEs. Thus, SI SL-DRX configurations may need to be aligned with multiple UEs in some embodiments.

In another example, obtaining the updated system information may take more time for the relay UE 104 before it can forward the system information (for example, SI x) or indication of the updated SI index (for example, SI index=x) to the remote UE 106. For example, as discussed above, an SI update may occur in a modification period that follows a modification period in which the system information modification indication is transmitted. A modification period can be multiples of default paging cycle, which may result in a significant delay. PWS changes through SIB6/7/8 are not subject to the modification period delay.

Figure 7:
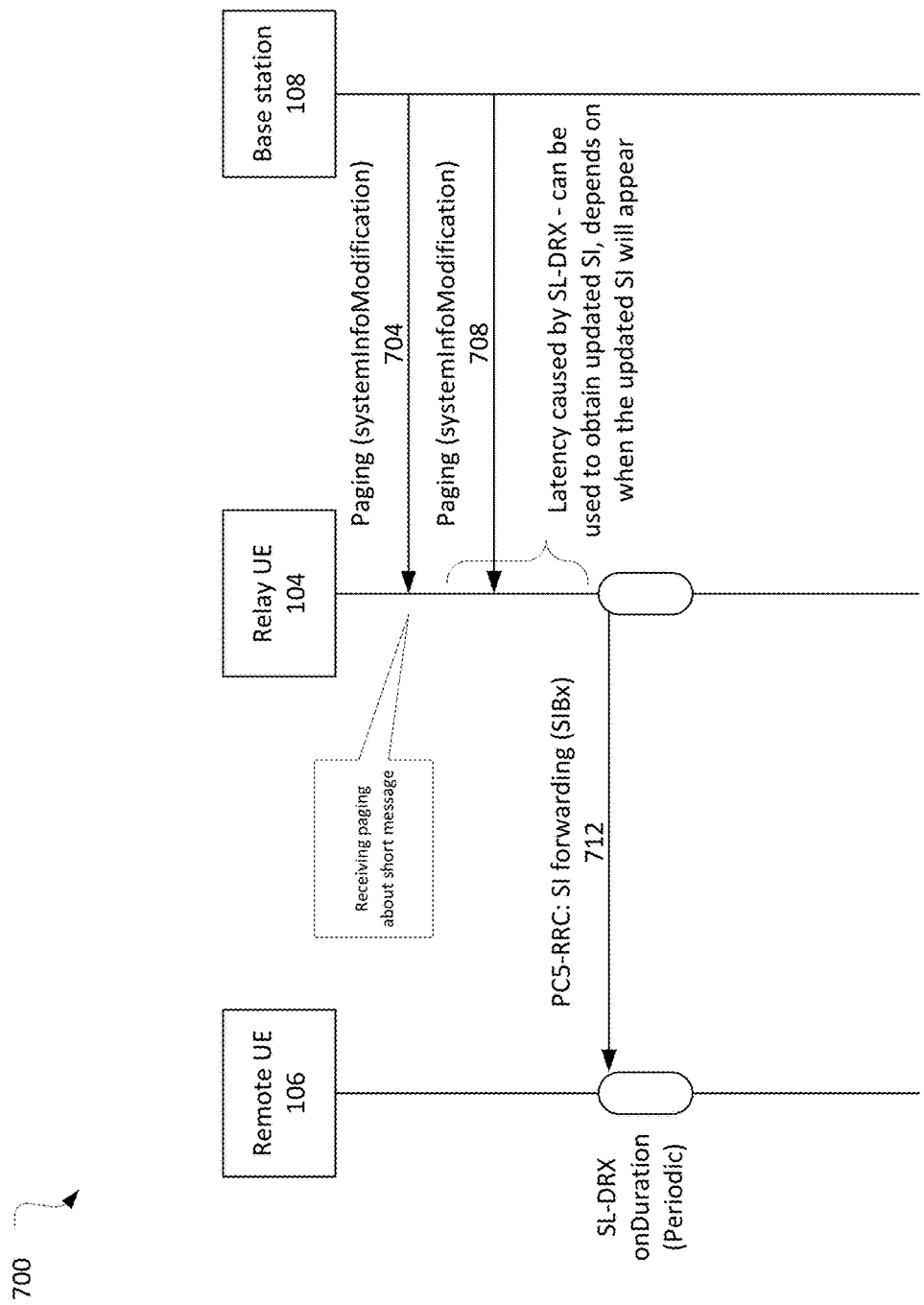
FIG. 7 illustrates another signaling flow in accordance with some embodiments.

FIG. 7 provides a signaling diagram 700 that illustrates an SI SL-DRX in accordance with some embodiments. The SI SL-DRX may be configured based on P-RNTI and paging cycle for short message. The SI SL-DRX configuration may have a DRX cycle that matches the modification period, which may be multiples of a default paging DRX cycle. For example, if the idle mode DRX cycle length of the network is 1.28 seconds, the SI SL-DRX cycle for SI forwarding may be longer than 1.28 seconds towards the remote UE 106 as long as it is within the latency requirements for delivering SI messages.

The base station 108 may periodically send paging about short messages with system information modification at 704 and 708. The relay UE 104 may receive the paging about short message transmitted at 704. The relay UE 104 may then forward the SI message (which may include SI or an indication of updated SI) at 712 during the next SL-DRX on duration. The SI message may be forwarded in a PC5-RRC message.

The long DRX cycle length of the SI SL-DRX configuration may result in a relatively long latency between receiving paging about short message at 704 and forwarding the SI at 712. This delay may be longer than a paging cycle in some instances. The relay UE 104 may use this latency to obtain updated SI upon which the SI forward message may be based. The starting time of the on-duration period may be set to a time by which the updated SIB(s) are expected to be acquired in each modification period.

Given that than SL-DRX may be configured statically, these embodiments may be most useful if the relay UE 104 can predetermine the time by which the updated SI will be obtained. This may be based on a mechanism to rebroadcast a fixed SIB, for example.

In some instances, it may be difficult to predict which SIBs will change and by when the updated SI will be received. Thus, some embodiments describe generating a paging/SI SL-DRX configuration with one DRX cycle to accommodate both paging and SI forwarding. This may be used in a sidelink unicast case in which SL-DRX is used by a single remote UE and the relay UE.

In some embodiments, the shorter DRX cycle for paging and the longer DRX cycle for SI may be merged to a single short DRX cycle. The relay UE 104 may set up only one SL-DRX cycle with an on-duration period that is suitable to deliver both paging and SI forwarding to the remote UE 106.

The SL-DRX cycle may be based on how frequently the relay UE 104 monitors paging and SI. The frequency of monitoring paging may be derived from the idle mode DRX cycle used by the relay UE 104 to intercept paging of the remote UE 106. The frequency of monitoring SI may derive from the modification period that corresponds to how frequently the SI may change. The on-duration period of the SL-DRX configuration may be based on the paging occasion of the remote UE 106. For example, the on-duration period may be set immediately (or shortly) after the paging occasion in order to deliver the paging for the remote UE 106 with little delay.

When the relay UE 104 receives paging, ETWS/CMAS, or SIB(s) relevant to the remote UE 106, the relay UE 104 may deliver the information during the next available on-duration period. The SL-DRX cycle may be configured to ensure the SI messages will still be delivered timely. For example, CMAS is to be delivered within four seconds according to government regulation, but the SL-DRX cycle may be configured to be much less. For example, the SL-DRX cycle may be configured to match a Uu paging cycle of, for example, 320 ms, 640 ms. 1.28 s, or 2.56 s. As long as the SL-DRX cycle is less than 4 seconds, there may be no need to further optimize for ETWS/CMAS delivery latency.

Some embodiments may provide other measures to ensure more timely delivery of system information instead of waiting for the next on-duration period, while still accounting for the trade-off between latency and power consumption. Some embodiments may provide for timely SI forwarding by utilizing an additional one-time wake up period (active time), which may be indicated during the on-duration period of the normal paging/SI DRX cycle. The active time for SI forwarding may be based on a predicted time in which the relay UE 104 can retrieve the latest ETWS/CMAS or modified SIBs registered by the remote UE 106, assuming at least one of those SIBs are to be delivered to the remote UE 106.

Figure 8:
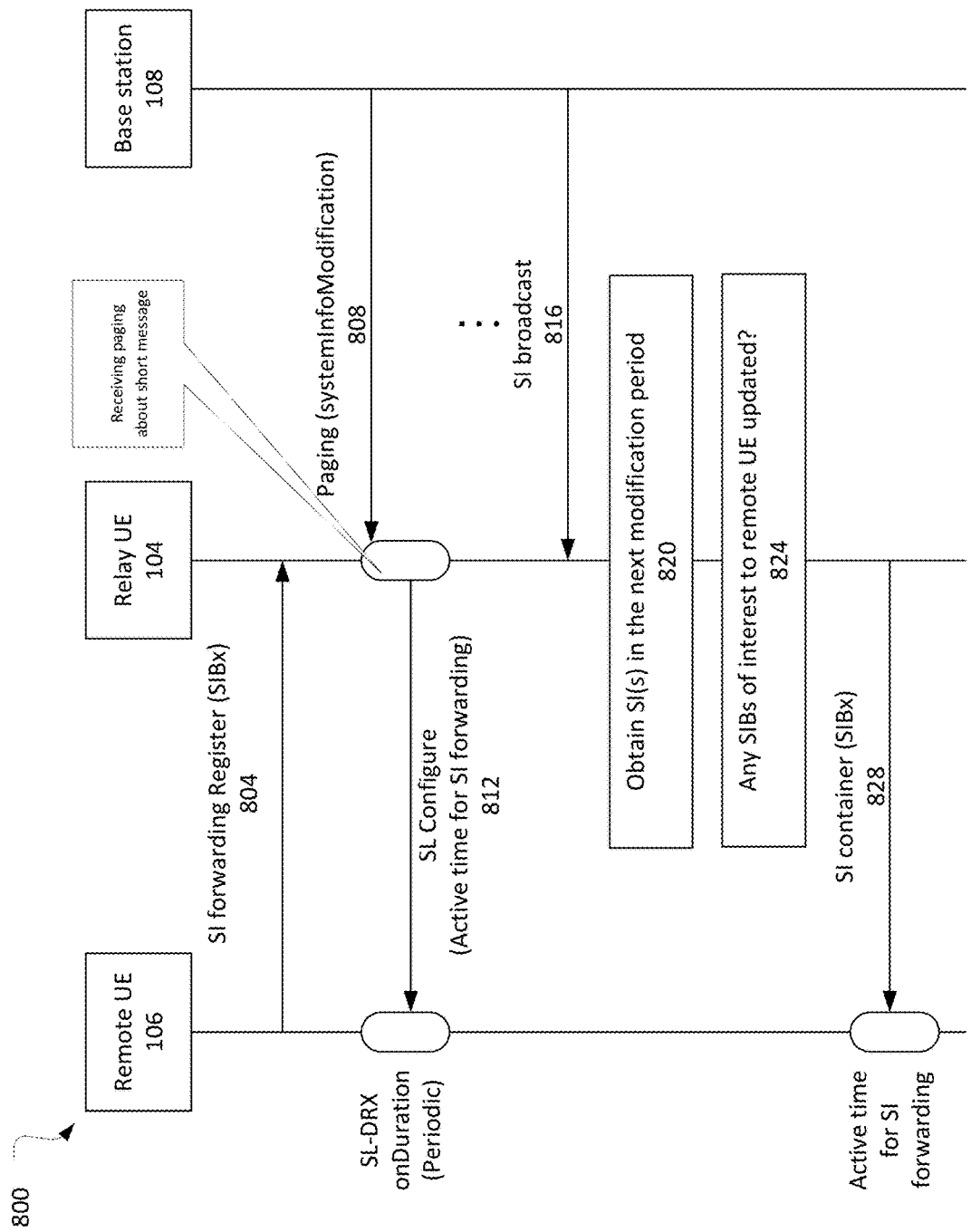
FIG. 8 illustrates another signaling flow in accordance with some embodiments.

FIG. 8 provides a signaling diagram 800 that illustrates an SL-DRX utilizing an active time for SI forwarding in accordance with some embodiments.

At 804, the remote UE 106 may transmit an SI forwarding register message to the relay UE 104. The SI forwarding register message may be similar to SI forwarding register message 406 described above with respect to FIG. 4.

At 808, the relay UE 104 may receive paging about short message with a system information modification indication.

The relay UE 104 may then generate and transmit an SL configure message 812 to the remote UE 106 during an SL-DRX on duration. The SL configure message 812 may configure an active time for SI forwarding. In some embodiments this active time for SI forwarding may be dynamically configured by the relay UE 104 as needed. For example, the relay UE 104 may enable this only when ETWS/CMAS is detected in short message and may not enable this if the PWS broadcast is stopped.

The signaling diagram 800 may further include the relay UE 104 receiving an SI broadcast message 816 from the base station 108. At 820, the relay UE 104 may obtain the SI(s) that have been updated in the next modification period. The relay UE 104 may examine the updated SIB(s) to determine, at 824, whether any of them are of interest to the remote UE 106. If one or more updated SIBs are of interest to the remote UE (e.g., SIBx), the relay UE 104 may forward them to the remote UE 106 in an SI container 828 during the active time for SI forwarding.

If the relay UE 104 does not detect any updated SIBs of interest at 824, it may not deliver anything to the remote UE 106 during the active time for SI forwarding.

Figure 9:
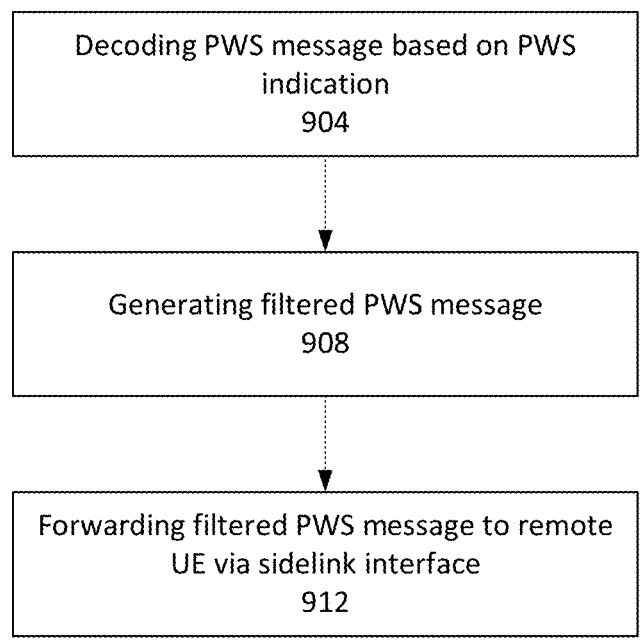
FIG. 9 illustrates an operation flow/algorithmic structure in accordance with some embodiments.

The mechanism for the one shot active time may be triggered again as long as the message has not been successfully delivered due to any failure in SI retrieval in Uu interface or SI forwarding via the PC5 interface. In this case, for example, during the first one-shot active time, if the SI is not ready to be forwarded during this active period on the PC5 interface, a second one-shot active time in PC5 interface is scheduled based on the relay UE's latest estimated time for relay UE forwarding the SIB to remote UE FIG. 9 provides an operation flow/algorithmic structure 900 in accordance with some embodiments. The operation flow/algorithmic structure 900 may be performed/implemented by a UE such as, for example, relay UE 104, UE 1200 or by components thereof, for example, processors 1204.

The operation flow/algorithmic structure 900 may include, at 904, decoding a PWS message based on a PWS indication. The PWS indication may be received in DCI format 1_0 having its CRC scrambled with P-RNTI. The PWS indication may indicate a change with respect to ETWS primary notification transmitted in SIB6, ETWS secondary notification transmitted in SIB7, or CMAS notification transmitted in SIB8. The PWS message may be SI messages that include SIB6/7/8. In some embodiments, the PWS message may be received as a plurality of segments.

The operation flow/algorithmic structure 900 may further include, at 908, generating a filtered PWS message. In some embodiments, the filtered PWS message may be generated by examining the segments of the PWS message received at 904. The filtered BWS message may then be generated with a complete set of segments of the PWS message, with duplicate and out-of-order segments being removed.

In some embodiments, the filtering of the PWS message may be further based on a location of the remote UE. For example, PWS messages that are associated with an alert area that does not include the location the remote UE may be filtered out and not forwarded to the remote UE.

The operation flow/algorithmic structure 900 may further include, at 912, forwarding the filtered PWS message to the remote UE via a sidelink interface. In some embodiments, the filtered PWS message may be transmitted in a SI container that comprises a PC5-RRC message, a relay discovery message, or a message transmitted on an SLRB dedicated for SI message forwarding.

Figure 10:
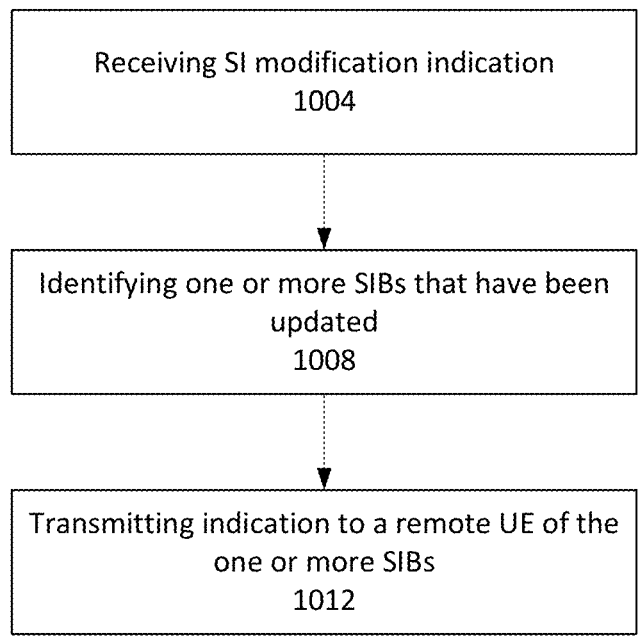
FIG. 10 illustrates another operation flow/algorithmic structure in accordance with some embodiments.

FIG. 10 provides an operation flow/algorithmic structure 1000 in accordance with some embodiments. The operation flow/algorithmic structure 1000 may be performed/implemented by a UE such as, for example, relay UE 104, UE 1200 or by components thereof, for example, processors 1204.

The operation flow/algorithmic structure 1000 may include, at 1004, receiving an SI modification indication. The SI modification indication may be received in DCI format 1_0 having its CRC scrambled with P-RNTI. The SI modification indication may indicate a change to BCCH content other than SIB6/7/8.

The operation flow/algorithmic structure 1000 may further include, at 1008, identifying one or more SIBs that have been updated. To identify SIBs that are updated, the relay UE may acquire and examine a set of SIBs to determine whether they have been updated.

The operation flow/algorithmic structure 1000 may further include, at 1012, transmitting an indication to a remote UE of the one or more SIBs. In some embodiments, the indication may be a list that identifies SIBs that have been updated. In some embodiments, the indication may further include a list that identifies SIBs that have not been updated. The updated list and non-updated list may correspond to the set of SIBs acquired and examined at 1008.

After transmitting the list that identifies the SIBs that have been updated, the relay UE may receive a request for one or more updated SIBs from the remote UE. The relay UE may then respond with the requested information.

Figure 11:
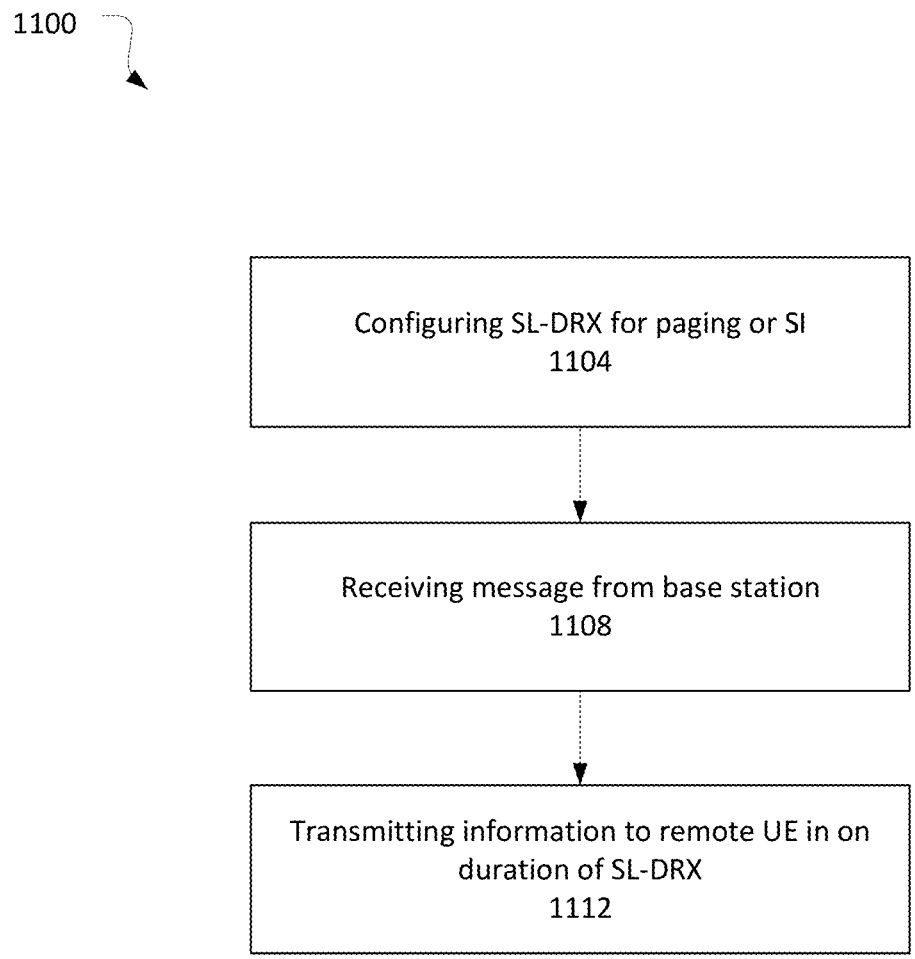
FIG. 11 illustrates another operation flow/algorithmic structure in accordance with some embodiments.

FIG. 11 provides an operation flow/algorithmic structure 1100 in accordance with some embodiments. The operation flow/algorithmic structure 1100 may be performed/implemented by a UE such as, for example, relay UE 104, UE 1200 or by components thereof, for example, processors 1204.

The operation flow/algorithmic structure 1100 may include, at 1104, configuring an SL-DRX for paging or SI forwarding. The SL-DRX configuration may be established based on a periodicity of paging or SI update messages from the network. In some embodiments, the SL-DRX may be specifically configured for paging, may be specifically configured for SI forwarding, or may be configured to accommodate both paging and SI forwarding.

The operation flow/algorithmic structure 1100 may further include, at 1108, receiving a message from a base station. The message may be a paging message that includes a paging indication or an SI message that includes updated SI content.

The operation flow/algorithmic structure 1100 may further include, at 1112, transmitting information to a remote UE in an on-duration period of the SL-DRX. The information may be based on the message received from base station at 1108. For example, the information may be a paging indication, an updated SIB, or an indication of one or more SIBs that have been updated.

Figure 12:
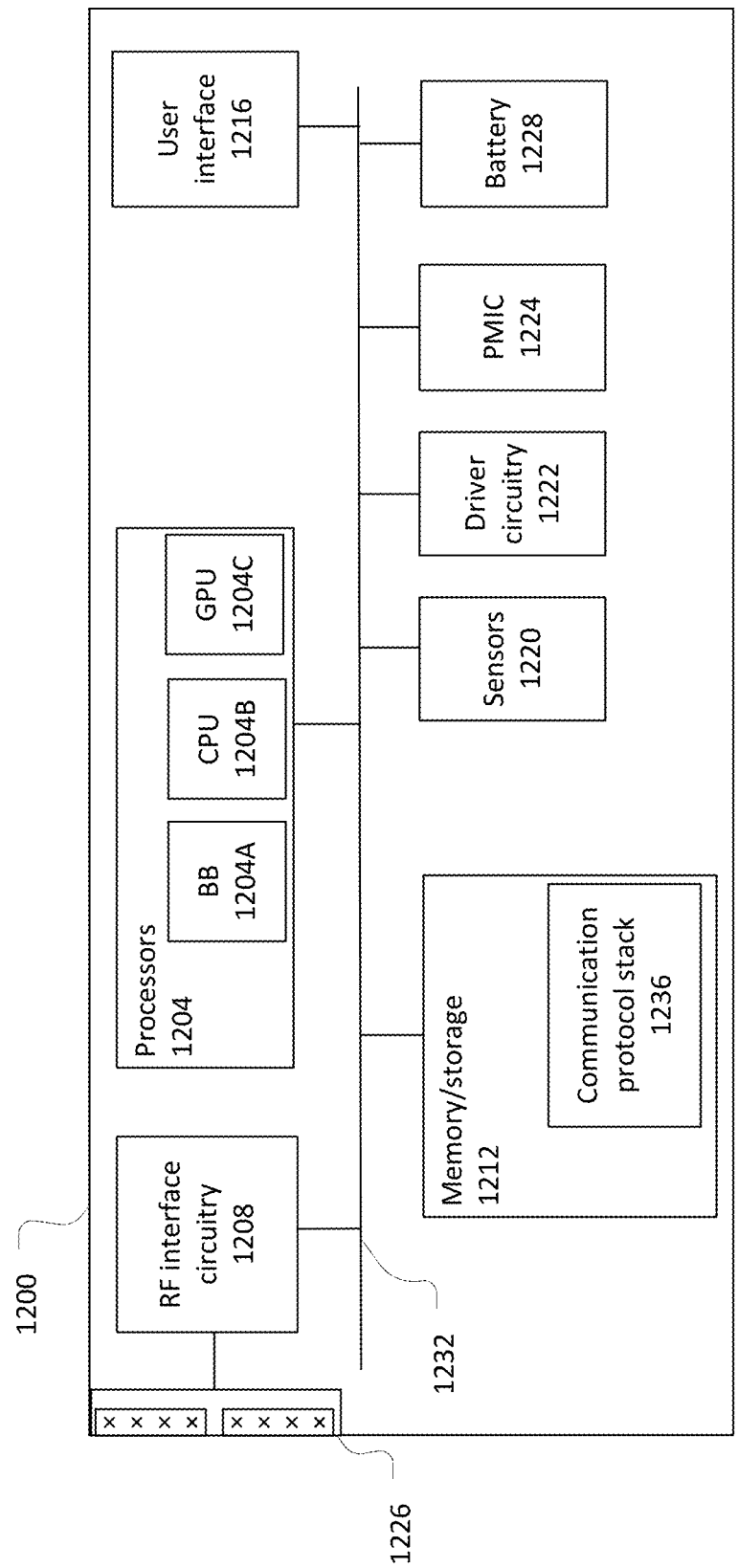
FIG. 12 illustrates a user equipment in accordance with some embodiments.

FIG. 12 illustrates a UE 1200 in accordance with some embodiments. The UE 1200 may be similar to and substantially interchangeable with relay UE 104 or remote UE 106.

The UE 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, or optical connection that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack 1236 to: perform user plane functions at a PHY layer, MAC layer, RLC layer, PDCP layer, and SDAP layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1212 may include one or more non-transitory, computer-readable media that includes instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR and sidelink access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, or phased array antennas. The antenna 1226 may have one or more panels designed for specific frequency bands including bands in FR1 or FR2.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

FIG. 10 illustrates a base station 1000 in accordance with some embodiments. The base station 1000 may be similar to and substantially interchangeable with base station 108.

The base station 1000 may include processors 1004, RF interface circuitry 1008 (if implemented as a base station), core network (CN) interface circuitry 1012, memory/storage circuitry 1016, and antenna structure 1026 (if implemented as a base station).

The components of the base station 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 8.

The CN interface circuitry 1012 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

In some embodiments, the base station 1000 may be coupled with transmit receive points (TRPs) using the antenna structure 1026, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a relay user equipment (UE), the method comprising: establishing a sidelink communication with a remote UE; receiving, in downlink control information (DCI), a public warning system (PWS) indication; decoding, based on the PWS indication, a public warning system (PWS) message; generating, based on the PWS message, a filtered PWS message; and forwarding the filtered PWS message to the remote UE.

Example 2 includes the method of example 1 or some other example herein, wherein the PWS message comprises system information having a system information block (SIB) 6, SIB 7, or SIB 8.

Example 3 includes the method of example 1 or some other example herein, wherein generating the filtered PWS message comprises: removing, from the PWS message, content that was previously forwarded to the remote UE.

Example 4 includes the method of example 1 or some other example herein, further comprising: decoding the PWS message to obtain a first plurality of segments; and generating the filtered PWS message by generating a second plurality of segments by removing, from the first plurality of segments, duplicative and out-of-order segments.

Example 5 includes the method of example 4 some other example herein, further comprising: forwarding the filtered PWS message based on a determination that the second plurality of segments includes a complete set of segments.

Example 6 includes a method of example 1 or some other example herein, wherein forwarding the filtered PWS message comprises: generating a system information (SI) container that includes the filtered PWS message; and transmitting the SI container to the remote UE via a sidelink channel.

Example 7 includes a method of example 6 or some other example herein, wherein the SI container comprises a PC5—radio resource control message; a relay discovery message; or a message transmitted on a sidelink radio bearer (SLRB) dedicated for SI message forwarding.

Example 8 includes the method of example 1 or some other example herein, wherein the PWS message includes information to define an alert area and the method further comprises: determining a location of the remote UE is within the alert area; and generating the filtered PWS message without the information to define the alert area.

Example 9 includes the method of example 8 or some other example herein, wherein determining the location of the remote UE comprises: determining an upper bound of a range of the sidelink communication; or determining a proximity of the remote UE based on a sidelink radio quality measurement.

Example 10 includes a method of operating a relay user equipment (UE), the method comprising: establishing a sidelink communication with a remote UE; receiving, in downlink control information (DCI), a system information (SI) modification indication; identifying one or more system information blocks (SIBs) that have been updated; and transmitting an indication to the remote UE of the one or more SIBs.

Example 11 includes the method of example 10 or some other example herein, wherein identifying the one or more SIBs that have been changed comprises: acquiring and examining a set of SIBs based on the SI modification indication; and identifying the one or more SIBs that have been updated based on acquiring and examining the set of SIBs.

Example 12 includes the method of example 10 or some other example herein, wherein transmitting the indication comprises: transmitting a list of indices of the one or more SIBs that have been updated.

Example 13 includes the method of example 10 or some other example herein, further comprising: receiving, from the remote UE, a request for an updated SIB selected from the one or more SIBs; and transmitting the updated SIB to the remote UE based on the request.

Example 14 includes the method of example 10 or some other example herein, further comprising: transmitting, to the remote UE, a list of indices of SIBs examined for an update based on the SI modification indication and additional indications about whether each of the SIBs have been updated.

Example 15 includes the method of example 14 or some other example herein, further comprising: receiving, from the remote UE, an indication of interest in a SIB that is not included in the list; examining the SIB to determine whether it has been updated; and transmitting a message to the remote UE with results of examining the SIB.

Example 16 includes a method of operating a relay user equipment (UE), the method comprising: establishing a sidelink communication with a remote UE; establishing a sidelink discontinuous reception (SL-DRX) configuration for communicating with the remote UE based on a paging occasion used by a network to page the remote UE; receiving, from a base station, a paging message directed to the remote UE; and transmitting a paging indication based on the paging message to the remote UE during an on-duration of the SL-DRX configuration.

Example 17 includes the method of example 16 or some other example herein, wherein establishing the SL-DRX configuration is based on a DRX configuration provided by the base station.

Example 17 includes the method of example 16 or some other example herein, wherein the SL-DRX configuration comprises a DRX cycle that is equal to a paging cycle of the base station.

Example 18 includes a method of example 16 or some other example herein, wherein the SL-DRX is a paging SL-DRX configuration and the method further comprises: determining a system information (SI) SL-DRX configuration; receiving SI updates from a network over a modification period; and transmitting an SI update message to the remote UE during an on-duration period of the SI SL-DRX configuration.

Example 19 includes a method of example 18 or some other example herein, wherein transmitting the SI update message further comprises: transmitting the SI update message to a plurality of remote UEs as a group-cast or broadcast message.

Example 20 includes the method of example 18 or some other example herein, wherein the SI SL-DRX configuration comprises a DRX cycle that corresponds to the modification period.

Example 21 includes a method of operating a relay user equipment (UE), the method comprising: establishing a sidelink communication with a remote UE; establishing a sidelink discontinuous reception (SL-DRX) configuration for communicating with the remote UE based on a periodicity of paging or system information (SI) update messages from a network; receiving a paging or SI update message; and transmitting information to the remote UE based on the paging or SI update message during an on-duration of the SL-DRX configuration.

Example 22 includes the method of example 20 or some other example herein, further comprising: generating a sidelink configuration message to enable an active time for SI forwarding; transmitting the sidelink configuration message during a third on-duration of the SL-DRX configuration; detecting an update to a system information block that is of interest to the remote UE; and transmitting, in the active time for SI forwarding, the system information block.

Example 23 includes a method of operating a remote user equipment (UE), the method comprising: receiving, from a relay UE, a list of system information blocks (SIBs) that have been updated; transmitting, to the relay UE, a system information (SI) request to request a SIB selected from the list of SIBs that have been updated; and receiving, from the relay UE, the SIB.

Example 24 includes the method of example 23 or some other example herein, wherein the SIB is a first SIB and the method further comprises: receiving, from the relay UE, additional information to determine a second SIB of interest to the remote UE has an ambiguous update status; transmitting a request to the relay UE to acquire and examine the second SIB; and receiving the second SIB from the relay UE if the second SIB was updated.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof.

Example 30 may include a signal as described in or related to any of examples 1-24, or portions or parts thereof.

Example 31 may include a datagram, information element, packet, frame, segment, PDU, or message as described in or related to any of examples 1-24, or portions or parts thereof, or otherwise described in the present disclosure.

Example 32 may include a signal encoded with data as described in or related to any of examples 1-24, or portions or parts thereof, or otherwise described in the present disclosure.

Example 33 may include a signal encoded with a datagram, IE, packet, frame, segment, PDU, or message as described in or related to any of examples 1-24, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Example 35 may include a computer program comprising instructions, wherein execution of the program by a processing element is to cause the processing element to carry out the method, techniques, or process as described in or related to any of examples 1-24, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:
    receive, from a remote user equipment (UE), a message that includes an interest list of one or more system information blocks (SIBs) for which updates are requested, wherein the interest list corresponds to a delta request that includes changes to one or more previous requests;
    obtain a SIB of the one or more SIBs from a base station; and
    output the SIB for transmission to the remote UE.

2. The one or more non-transitory, computer-readable media of claim 1, wherein the interest list is a first interest list and the computer-readable media of claim 1, wherein the instructions, when executed, further cause the processing circuitry to:
    add, to a second interest list of SIBs stored at a relay UE, the one or more SIBs from the first interest list; and
    monitor updates to the second list of SIBs.

3. The one or more non-transitory, computer-readable media of claim 1, wherein the instructions, when executed, further cause the processing circuitry to:
    receive a de-registration message from the remote UE; and
    cease forwarding SIBs of the interest list based on the de-registration message.

4. The one or more non-transitory, computer-readable media of claim 1, wherein the instructions, when executed, further cause the processing circuitry to:
    determine the SIB has been updated; and
    output the SIB for transmission to the remote UE based on the determination that the SIB has been updated.

5. The one or more non-transitory, computer-readable media of claim 4, wherein the instructions, when executed, further cause the processing circuitry to:
    receive, in downlink control information (DCI), a system information (SI) modification indication; and
    determine the SIB has been updated based on the SI modification indication.

6. The one or more non-transitory, computer-readable media of claim 1, wherein the message is received from the remote UE when the remote UE is in a radio resource control (RRC) idle or inactive mode.

7. An apparatus comprising:
processing circuitry to:
- identify a plurality of system information blocks (SIBs) for which requests have not been previously sent to a relay UE; and
- generate a message, to be transmitted to the relay UE, to include a list of the plurality of SIBs for which updates are requested; and interface circuitry coupled with the processing circuitry to enable communication.

8. The apparatus of claim 7, wherein the processing circuitry is further to:
output the message for transmission to the relay UE.

9. The apparatus of claim 8, wherein the processing circuitry is to output the message for transmission to the relay UE while in a radio resource control (RRC) idle or inactive state.

10. The apparatus of claim 7, wherein the processing circuitry is further to:
generate a de-registration message to be sent to the relay UE to release the request for the SIB.

11. A method comprising:
- receiving, from a remote user equipment (UE), a message that includes an interest list of one or more system information blocks (SIBs) for which updates are requested;
- receiving a SIB of the one or more SIBs from a base station;
- forwarding the SIB to the remote UE;
- receiving a de-registration message from the remote UE; and
- ceasing forwarding SIBs of the interest list based on the de-registration message.

12. The method of claim 11, wherein the message includes an interest list of one or more SIBs, including the SIB, for which the remote UE requests updates.

13. The method of claim 12, wherein the interest list is a first interest list and the method further comprises:
- adding, to a second interest list of SIBs stored at a relay UE, the one or more SIBs from the first interest list; and
- monitoring updates to the second interest list of SIBs.

14. The method of claim 13, wherein the first interest list corresponds to a delta request that includes changes to one or more previous requests.

15. The method of claim 11, further comprising:
- determining the SIB has been updated; and
- transmitting the SIB to the remote UE based on determining that the SIB has been updated.

16. The method of claim 15, further comprising:
- receiving, in downlink control information (DCI), a system information (SI) modification indication; and
- determining the SIB has been updated based on the SI modification indication.

* * * * *